March 1, 1966  J. E. ANDERSON ETAL  3,238,349
LOW CURRENT ARC TORCH AND POWER SUPPLY
Filed Sept. 5, 1963                           2 Sheets-Sheet 1
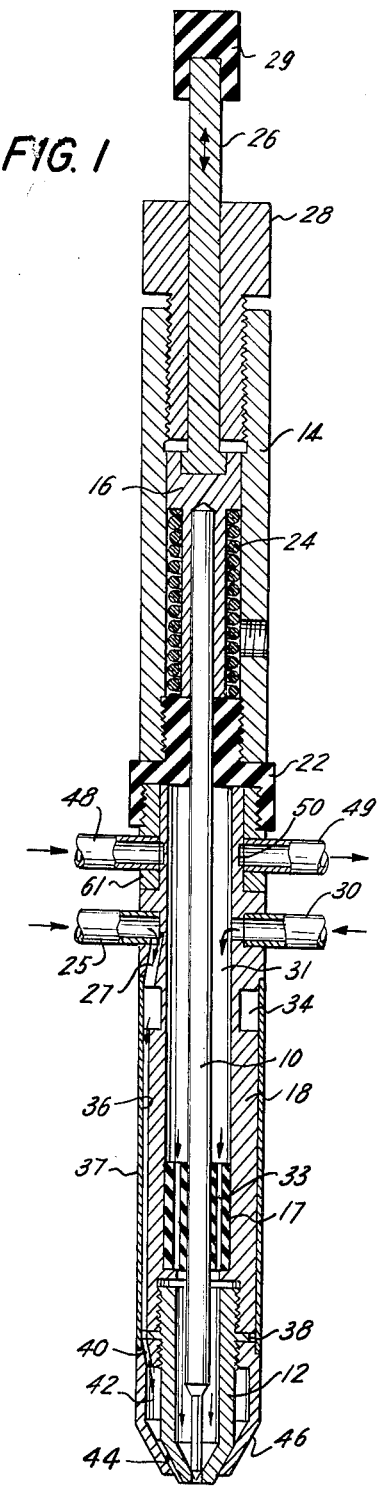
INVENTORS.
JOHN E. ANDERSON
WILLIAM J. RUNKLE
BY Richard S. Sluser
ATTORNEY

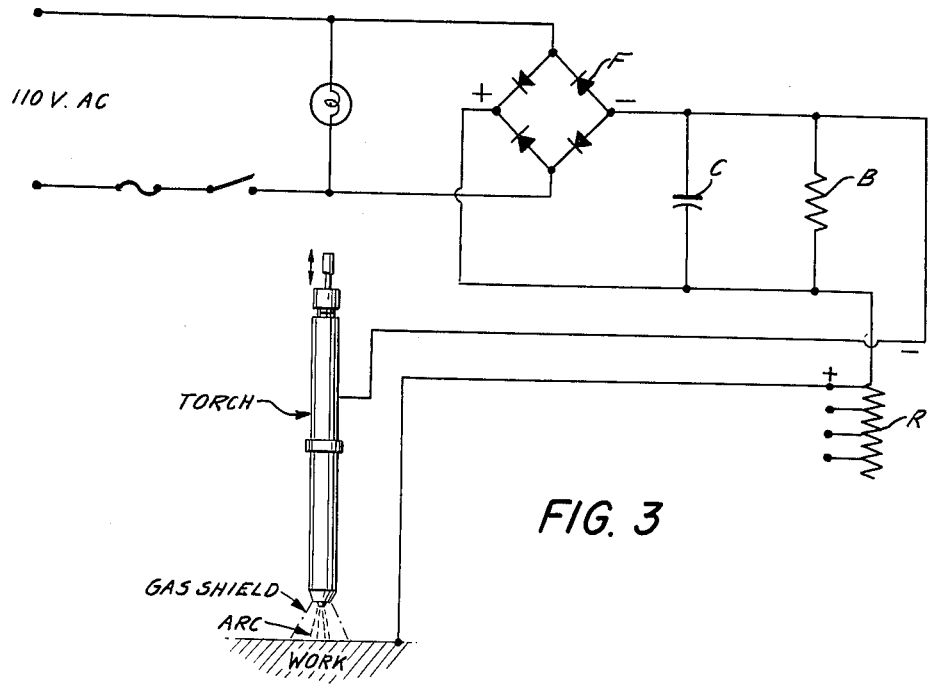
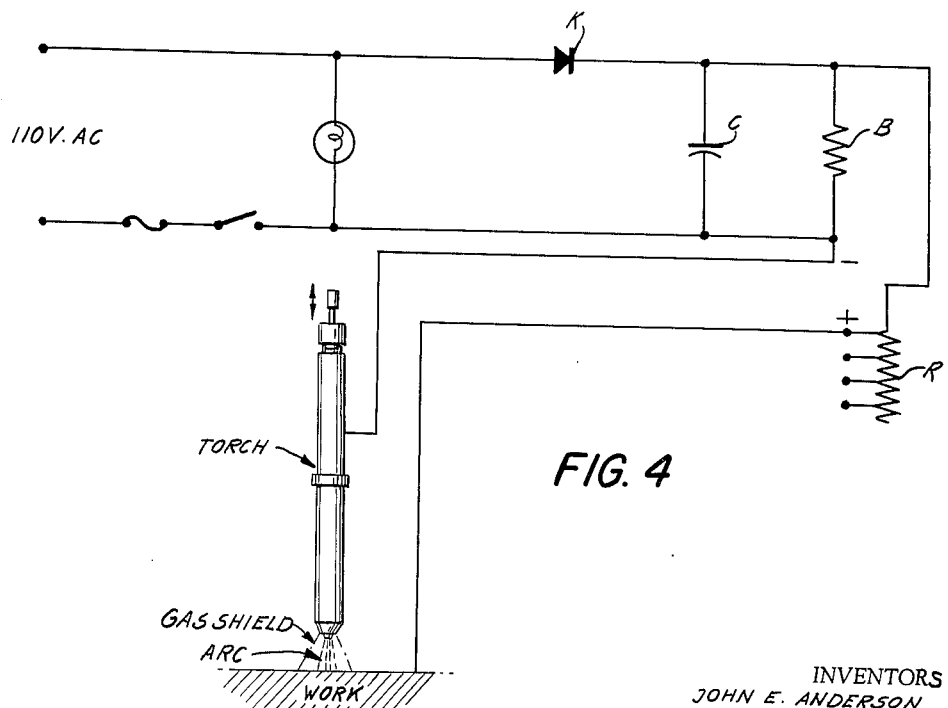

United States Patent Office 3,238,349
Patented Mar. 1, 1966

3,238,349
LOW CURRENT ARC TORCH AND
POWER SUPPLY
John E. Anderson and William J. Runkle, Indianapolis, Ind., assignors to Union Carbide Corporation, a corporation of New York
Filed Sept. 5, 1963, Ser. No. 306,752
9 Claims. (Cl. 219—75)

Arc torches have been used for many years for welding and other metal working processes. In such applications, the torches for producing the arcs have for the most part been adapted to high current operation for "heavy" work. As such, the torches are not amenable for easy hand operation or portability. In addition, the torches are not particularly suitable for brazing and soldering operations.

Further, when using smaller torches (current rating of about 25 amperes) it is highly desirable for ease in handling that the arc be capable of being easily started through "touch starting." The term "touch starting" is here meant to mean starting by contacting the electrode with the surrounding nozzle electrode. This leads to the problem of ensuring a reliable start at low currents.

Not only are the torches themselves too cumbersome for small scale operations, so also are the power supplies for the torches. More specifically, the bulk of the prior arc power supplies (welding generators) utilizes a 6 rectifier system for a 3 phase A.C. current source. Not only is such a power source cumbersome, but it limits the availability of current sources.

It is, therefore, an object of the present invention to provide an arc torch that is readily portable and has general utility for soldering, brazing, and small scale welding applications.

It is another object of the invention to provide a torch having a current rating up to 25 amperes the arc of which can be readily started through touch starting.

It is yet another object to provide a power supply for such a torch that is light, portable and easy to handle.

Another object is to provide a power source that is capable of being connected to the more conventional 110 v. single phase A.C. outlets.

These objects are in general carried out by the apparatus shown in the accompanying drawings in which:

FIGURE 1 is a vertical cross-section of the novel torch; and

FIGURES 2, 3 and 4 are schematics of alternate forms of the novel power supply.

In general, an arc torch for operation at current levels up to about 25 amperes is provided with a movable central stick electrode having a diameter no greater than 1/8 inch such that touch starting of the electrode with the surrounding nozzle electrode can be readily achieved and a stable arc maintained. The position of the stick electrode with respect to the nozzle is adjustable. The torch also utilizes dual gas feeds and water cooling located only at the mid-portion. Three variations of a power supply that is capable of operating from a 110 v. A.C. power source are used.

Referring now to FIG. 1, the torch essentially consists of a movable electrode 10 and a surrounding electrode 12. Electrode 10 is held in alignment through the rear electrode body 14, spring biased electrode holder 16, front torch body 18, insulator collet 17 and insulator 22. Nozzle electrode 12 is held in alignment with electrode 10 through torch body 18. The front and rear torch bodies are separated from each other by insulator 22. Insulator 22 also serves as a stop for the spring 24 and the electrode holder 16.

Thus, the torch comprises aligned upper and lower bodies 14 and 18 with an apertured insulator 22 therebetween, with an electrode holder 16 mounted in said upper body. The lower body 18 comprises a barrel with an outside diameter of the order of three quarters of an inch.

The nozzle 12 is a gas directing nozzle secured to the bottom of the barrel 18 and has a gas constricting orifice in the center thereof. The insulator collet 17 is a tube preferably of ceramic, having a plurality of passages 33 formed in the walls thereof.

The bore of the barrel 18 is of substantially uniform diameter, forming with the electrode 10 a substantially unobstructed annular passage 31 between the insulators 17 and 22.

An arc can be established by contacting electrode 10 with the nozzle electrode 12. (Position shown in the drawings.) This is readily accomplished by depressing the rod 26 thus lowering the electrode holder and the electrode until contact is made with the nozzle. Upon release of the rod 26, spring 24 forces the holder back until it becomes engaged with the lower end surface of the cap 28.

It should be noted that cap 28 threadedly engages rear torch body 14 such that the setting of the cap with respect to the torch body is adjustable. This makes it possible to adjust the setback of the electrode 10 from the electrode nozzle 12. Further it allows a constant arc gap between the electrode and nozzle to be maintained even though erosion of the electrode may occur. Insulator 29 permits the operator to depress the rod without being in electrical contact with the torch.

For this torch, which is operating at current levels of about 25 amperes, it has been found that the electrode diameter should be no greater than 1/8 inch (.012 sq. in.) for reliable touch starting. That is, should a diameter greater than this be used, the electrode will not become hot enough to initiate the arc.

Suitable materials for electrode 10 are those having good electrical emissivity such as tungsten or tungsten containing thoria, and for the nozzle, good thermally conductive materials such as copper could be used.

To maintain the small diameter of the torch, annular chambers and passages for fluids supplied thereto are formed by grooves in the outside of the barrel 18. The groove forming the gas chambers 34 and 38, and the grooves forming the distributor passage 36 are covered by a sleeve 37. The groove forming the water chamber 50 is covered by a sleeve 61 through which pass the inlet 48 and the outlet 49.

The nozzle 12 has an annular shoulder engaging the bottom of the barrel 18, and a gas cup 46 has a collar engaging the nozzle shoulder. The shoulder being of smaller diameter forms the manifold 38 for auxiliary gas, and the collar has the passages 40 therein to receive gas from the manifold 38.

Shielding gas, such as argon, is supplied to the electrode by way of conduit 30 into annulus 31 from whence it is directed around the electrode and through the nozzle electrode 12 from passages 33. Such gas aids in preventing electrode erosion and also provides arc stability. Additional shielding gas is provided around the nozzle. This gas enters through the inlet 25 into conduit 27, then into annulus 34 from whence it passes into a plurality of conduits 36. From there the gas passes into annulus 38, through a plurality of conduits 40 into annulus 42 from whence it passes out around the electrode nozzle 12 through a plurality of conduits 44 formed in the gas cup 46. This outer gas sheath is especially useful for applications other than welding.

In fluxless soft soldering, for example, hydrogen gas coming from the conduits in the gas cup could be mixed with the argon plasma effluent to form a hot reducing gas for soldering. Since only argon passes through the arc, nozzle erosion is minimized, the arc voltage kept low, and the torch effluent is maintained uniform for long operating periods. In addition, hydrogen or helium emanating from the gas cup will produce a long thin plasma effluent which is highly desirable for soldering.

Since the torch is operating at current levels up to about 25 amperes, water cooling is needed only at the mid portion of the torch. As shown, the cooling water enters through inlet 48, flows around annulus 50 and then passes out the outlet 49. This simplified water cooling greatly reduces the size of the torch which lends to its amenability for hand operation.

The power supply for the torch is indicated in FIGS. 2–4. These three variations all have one thing in common; namely, they are capable of being operated off a single phase, 110 v. A.C. power source. This essentially removes all restrictions as to where the torch can be used. Referring to FIG. 2, the basic elements of the power supply are the transformer T to step down the voltage; a full wave bridge rectifier F to convert from A.C. to D.C.; a capacitor C and choke L to smooth out the ripple in the D.C. output; a resistor B to bleed down the capacitor after shutdown; and a resistor R with four taps to change the output volt-ampere characteristic curve. Cooling water is supplied for the rectifiers and the resistor R. For most operating conditions the resistance R is much greater than the arc resistance and changes in arc length change the arc voltage but has little effect on arc current.

Variations of the power supply are illustrated in FIGS. 3 and 4. In the power supply of FIG. 3, the transformer and the choke are eliminated. In the power supple of FIG. 4, the transformer and choke are eliminated and in addition only one rectifier K (giving half-wave rectification) is used in place of the bridge rectifier. These models greatly reduce the size, weight and expense of the rectifier at the sacrifice of greater ripple in the output voltage.

The torch may be operated either in a transferred or non-transferred mode. Also, either straight polarity (electrode 10 acting as cathode) or reverse polarity may be used. To operate on reverse polarity, the current connections for the electrode 10 and the nozzle are merely reversed from the connection indicated in FIG. 2. When operating in a transferred mode, the low current-high resistance tap of R is connected to the nozzle and the high current-low resistance tap of R is connected to the anode workpiece.

In all of the variations, the heat dissipated in resistor R is relatively high (up to 2 kw.). In order to employ a resistor capable of dissipating this much heat without increasing the overall size of the power supply, a small compact resistor was developd. This was accomplished by passing cooling water in direct contact with the resistance wire. The resistor consists of a resistance wire (2.5 ohms per foot) made into a coil spring and placed within a ¼ inch-I.D. plastic tube. Water was then passed through the tube to cool the wire. The plastic tube acts as an electrical insulator.

As an indication of the compactness of the power supply, the variation of FIG. 4 is readily contained within box 8″ x 6″ x 3½″. Also, the total power supply weighed less than 4 pounds.

*Example I*

Using the torch described with an electrode having a diameter of ⅛ of an inch at its largest cross section, two steel wires .020 inch in diameter were welded together. The power supply of FIG. 2 was used, the arc operating in a transferred mode. Argon at the rate of 1.16 c.f.h. was used as the electrode shielding gas. The arc operated at 10 amperes at 14 v.

*Example II*

Under the same conditions bead-on-plate tests were made on a 0.011 inch carbon steel plate. In addition, with the same power supply and with the same arc current and voltage, but with the torch operating non-transferred, the same steel wire was soft soldered to a tantalum capacitor. Hydrogen at the rate of about 1 c.f.h was passed through the torch by way of the passages in the gas cup. The soldering was done without the aid of a flux.

What is claimed is:

1. An arc torch comprising a barrel, a gas directing nozzle secured to the bottom of said barrel and having an arc constricting orifice, an electrode in said barrel, means for supplying electric current to said electrode, said electrode extending through the bottom of said barrel into said nozzle adjacent to said arc constricting orifice, said barrel having a bore forming with said electrode an annular passage therebetween extending longitudinally thereof, an insulator tube in the lower portion of said barrel forming a centering guide for the lower portion of said electrode, means for supplying gas to said passage, said centering guide having passages therethrough from said annular passage to the interior of said nozzle.

2. An arc torch as claimed in claim 1, in which said barrel has an outer annular groove therein, a sleeve covering said groove to form therewith an annular chamber, and means for supplying fluid to said chamber.

3. An arc torch as claimed in claim 1, in combination with a gas cup surrounding said nozzle, the wall of said barrel having passages therein for supplying auxiliary gas to said cup.

4. An arc torch as claimed in claim 1, in combination with an upper body aligned with said barrel, an insulator between said upper body and said barrel, an electrode holder slidable in said upper body, and a coil compressive spring below said holder surrounding said electrode and bearing on said insulator.

5. An arc torch comprising aligned upper and lower bodies with a centrally apertured insulator therebetween, an electrode holder mounted in said upper body, said lower body comprising a barrel having an outside diameter of the order of three quarters of an inch, a gas directing nozzle secured to the bottom of said barrel and having an arc constricting orifice, an electrode in said holder, means for supplying electric current through said upper body and holder to said electrode, said electrode extending from said holder in said upper body through the aperture of said insulator on through said barrel into said nozzle adjacent to said orifice, an insulator tube in the lower portion of said barrel adjacent to said nozzle forming a centering guide for the lower portion of said electrode, said barrel having a bore of substantially uniform diameter forming with said electrode a substantially unobstructed annular passage between said insulators, said barrel having a gas inlet to said bore passage below said body insulator, said centering guide insulator having passages therethrough from said bore passage to the interior of said nozzle.

6. An arc torch as claimed in claim 5, in which said barrel has an outer annular groove above said gas inlet, a sleeve covering said groove to form therewith a cooling jacket, and a water inlet and a water outlet in said cover for circulating cooling water through said groove.

7. An arc torch as claimed in claim 5, in which said barrel has an outer annular groove in the upper portion thereof. said barrel has a plurality of longitudinal grooves in the outer portion thereof extending from said annular groove to the bottom of said barrel, and a sleeve covering said grooves forming a manifold and distributor passages for supplying additional gas to said gas cup.

8. An arc torch as claimed in claim 7, in which said nozzle has an annular shoulder engaging the bottom of said barrel, a gas cup on said nozzle having a collar engaging said shoulder, said shoulder being of smaller diameter than said covering sleeve forming therewith a manifold for said auxiliary gas, said gas cup collar having passages therethrough to the inside thereof.

9. An arc torch as claimed in claim 5, in which said upper body comprises a barrel in which said electrode holder is slidably mounted, a cap screw for the top of said barrel, a plunger slidable through said cap screw and secured to the top of said holder, and a coil compressive spring in said barrel surrounding said electrode holder below said plunger and bearing on said body insulator, whereby the setback of the tip of the electrode from said gas nozzle is adjusted by turning of said cap screw.

References Cited by the Examiner

UNITED STATES PATENTS

| | | | |
|---|---|---|---|
| 2,188,436 | 1/1940 | Hugus | 321—27 |
| 2,898,441 | 8/1959 | Reed et al. | 219—75 |
| 3,025,388 | 3/1962 | Turbitt | 219—131 |
| 3,030,490 | 4/1962 | Reed | 219—75 |
| 3,106,634 | 10/1963 | Eschenbach et al. | 219—75 |

RICHARD M. WOOD, *Primary Examiner.*